(12) United States Patent
Sartori et al.

(10) Patent No.: US 9,591,635 B2
(45) Date of Patent: Mar. 7, 2017

(54) SYSTEMS AND METHODS FOR UE-SPECIFIC SEARCH SPACE AND EPDCCH SCRAMBLING

(71) Applicant: Futurewei Technologies, Inc., Plano, TX (US)

(72) Inventors: Philippe Sartori, Plainfield, IL (US); Vipul Desai, Palatine, IL (US); Brian Classon, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/707,933

(22) Filed: May 8, 2015

(65) Prior Publication Data

US 2015/0245330 A1 Aug. 27, 2015

Related U.S. Application Data

(63) Continuation of application No. 13/802,132, filed on Mar. 13, 2013, now Pat. No. 9,055,578.
(Continued)

(51) Int. Cl.
*H04W 4/00* (2009.01)
*H04W 72/04* (2009.01)
*H04L 5/00* (2006.01)

(52) U.S. Cl.
CPC ......... *H04W 72/042* (2013.01); *H04L 5/0053* (2013.01); *H04W 72/044* (2013.01)

(58) Field of Classification Search
None
See application file for complete search history.

(56) References Cited

U.S. PATENT DOCUMENTS

2002/0102981 A1 8/2002 Jechoux
2012/0320846 A1 12/2012 Papasakellariou et al.
(Continued)

FOREIGN PATENT DOCUMENTS

CN 102315870 A 1/2011
CN 102170703 A 8/2011
(Continued)

OTHER PUBLICATIONS

"LTE; Evolved Universal Terrestrial Radio Access (E-UTRA); Physical layer procedures (3GPP TS 36.213 version 8.8.0 Release 8)," ETSI TS 136 213 v8.8.0, Oct. 2009, 79 pages.
(Continued)

*Primary Examiner* — Chi H Pham
*Assistant Examiner* — Soon-Dong D Hyun
(74) *Attorney, Agent, or Firm* — Slater Matsil, LLP

(57) ABSTRACT

Encoded control information can be mapped to an enhanced physical downlink control channel (ePDCCH) search space of a user equipment (UE) in accordance with an offset and aggregation level. The ePDCCH search space may include a physical resource block (PRB) set located in a data region of a downlink subframe. The encoded control information may be mapped into one or more enhanced control channel elements (eCCEs) of the ePDCCH search space beginning from a starting location. The starting location is an eCCE location within the PRB set. The PRB set, as well as the starting/eCCE location within the PRB set, are identified in accordance with an offset associated with the UE. A number of eCCEs carrying encoded information corresponds to an aggregation level.

20 Claims, 6 Drawing Sheets

Related U.S. Application Data

(60) Provisional application No. 61/611,339, filed on Mar. 15, 2012.

(56) References Cited

U.S. PATENT DOCUMENTS

| | | | |
|---|---|---|---|
| 2013/0100901 A1* | 4/2013 | Shan | H04L 5/0048 370/329 |
| 2013/0114530 A1 | 5/2013 | Chen et al. | |
| 2014/0146769 A1 | 5/2014 | Ahn et al. | |
| 2014/0301359 A1 | 10/2014 | Seo et al. | |
| 2014/0355451 A1* | 12/2014 | Kim | H04L 1/0026 370/241 |
| 2015/0003349 A1* | 1/2015 | Kim | H04W 72/042 370/329 |
| 2015/0009927 A1* | 1/2015 | Larsson | H04L 1/0007 370/329 |
| 2015/0103800 A1* | 4/2015 | Seo | H04W 56/00 370/330 |

FOREIGN PATENT DOCUMENTS

| | | |
|---|---|---|
| CN | 102256358 A | 11/2011 |
| CN | 102355732 A | 2/2012 |
| EP | 2093953 A2 | 8/2009 |

OTHER PUBLICATIONS

"3rd Generation Partnership Project; Technical Specification Group Radio Access Network; Evolved Universal Terrestrial Radio Access (E-UTRA); Physical channels and modulation (Release 10)"3 GPP TS 36.211 V10.0.0, Dec. 2010, 103 pages.

"3rd Generation Partnership Project; Technical Specification Group Radio Access Network; Evolved Universal Terrestrial Radio Access (E-UTRA); Physical layer procedures (Release 10)," 3GPP TS 36.213 v10.0.0, Dec. 2012, 98 pages.

"3rd Generation Partnership Project; Technical SpecificationGroup Radio Access Network; Evolved Universal Terrestrial Radio Access (E-UTRA); Physical Channels and Modulation (Release 10)." 3 GPP TS 36.211 V10.3.0, Sep. 2011, 103 pages.

Extended European Search Report received in European Application No. 13761319 dated Jan. 7, 2015, 9 pages.

3GPP, "Search space design for e-PDCCH," 3GPP TSG RAN WG1 #67, R1-114125, Nov. 14-18, 2011, San Francisco, USA, 4 pages.

3GPP, "On the Structure and Usage Scenarios of ePDCCH," 3GPP TSG RAN WG1 Meeting #67, R1-114300, Nov. 14-18, 2011, San Francisco, USA, 10 pages.

3GPP, "Further details of ePDCCH UE-specific search space design," 3GPP TSG RAN WG1 Meeting #68, Dresden, Germany, Feb. 6-10, 2012, 6 pages.

3GPP, "Search Space Design for Downlink Control Channel," 3GPP TSG Ran WG1 Meeting #68, R1-120752, Dresden, German, Feb. 6-12, 2012, 6 pages.

* cited by examiner

SYSTEMS AND METHODS FOR UE-SPECIFIC SEARCH SPACE AND EPDCCH SCRAMBLING

This application claims is a continuation of U.S. patent application Ser. No. 13/802,132 filed on Mar. 13, 2013, entitled "Systems and Methods for UE-Specific Search Space and EPDCCH Scrambling," which claims priority to U.S. Provisional Application No. 61/611,339 filed on Mar. 15, 2012, entitled "Systems and Methods for UE-Specific Search Space and EPDCCH Scrambling," both of which are incorporated herein by reference as if reproduced in their entirety.

TECHNICAL FIELD

The present invention relates to systems and methods for wireless communications, and, in particular embodiments, to systems and methods for UE-specific search space and EPDCCH scrambling.

BACKGROUND

Third Generation Partnership Project (3GPP) Long Term Evolution (LTE) release 10 (rel-10) specifies downlink subframes that include both a control region and a data region, where control channels are carried entirely within the control region and data channels are carried entirely within the data region. For instance, the control region includes a Physical Downlink Control Channel (PDCCH) carrying resource allocation grants to user equipments (UEs) as well as other control channels, while the data region includes a Physical Downlink Shared Channel (PDSCH). However, this delineation between control and data channels may not be so clear cut in next-generation of 3GPP LTE standards, as 3GPP LTE release 11 (rel-11) will likely include an enhanced PDCCH (ePDCCH) that is at least partially carried in the data region of the downlink subframe. Because of this and other differences between the PDCCH and the ePDCCH, it may be infeasible and/or undesirable to simply extend PDCCH mapping procedures to the ePDCCH. Accordingly, new mechanisms for mapping of users and/or control information to the ePDCCH are desired.

SUMMARY

Technical advantages are generally achieved, by embodiments of this disclosure which describe systems and methods for UE-specific search space and EPDCCH scrambling.

In accordance with an embodiment, a method of communicating an enhanced physical downlink control channel (ePDCCH) is provided. In this example, the method includes determining an offset associated with a user equipment (UE), and determining, in accordance with the offset, an enhanced control channel element (eCCE) location in a physical resource block (PRB) set. The PRB set is included in an ePDCCH search space of the UE. The method further includes mapping encoded control information to one or more eCCEs of the ePDCCH search space starting from the eCCE location in the PRB set. The encoded control information indicates uplink or downlink resources allocated to the UE. The method further includes transmitting a subframe carrying the ePDCCH to the UE. An apparatus for performing this method is also provided.

In accordance with another embodiment, a method for searching an enhanced physical downlink control channel (ePDCCH) channel is provided. In this example, the method includes identifying an offset ($Y_{p,k}$), and identifying, in accordance with the $Y_{p,k}$, an eCCE location in an ePDCCH physical resource block (PRB) set (ePDCCH-PRB-set). The ePDCCH-PRB-set corresponds to an ePDCCH search space of a user equipment (UE). The method further includes locating one or more eCCEs in the ePDCCH-PRB-set beginning from the eCCE location in the ePDCCH-PRB-set. An apparatus for performing this method is also provided.

In accordance with yet another embodiment, a method for receiving control information is provided. In this example, the method includes receiving a subframe comprising an enhanced Physical Downlink Control Channel (ePDCCH), identifying an offset, and determining, in accordance with the offset, an enhanced control channel element (eCCE) location in a physical resource block (PRB) set. The PRB set is positioned in an ePDCCH search space of the UE. The method further includes locating one or more eCCEs within the ePDCCH search space starting from the eCCE location in the PRB set. The one or more eCCEs carry control information for the UE. An apparatus for performing this method is also provided.

In accordance with yet another embodiment, a method for scrambling control information is provided. In this example, the method includes generating a sequence of control channel bits and mapping a subset of control channel bits in the sequence of control channel bits to enhanced control channel elements (eCCEs) of the ePDCCH. The sequence of control channel bits have more bits than can be carried by an enhanced physical downlink control channel (ePDCCH). An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

As discussed above, the ePDCCH is carried (at least partially) in the data region of a downlink subframe, while the PDCCH is carried entirely in the control region of a downlink subframe. Other differences exist between the PDCCH and the ePDCCH. For instance, the control channel elements (CCEs) of the PDCCH are of a fixed size/capacity, while the enhanced control channel elements (eCCEs) of the ePDCCH may vary in size/capacity depending on which modulation order is used to encode control data of the ePDCCH, e.g., quadrature phase shift keying (QPSK), sixteen quadrature amplitude modulation (16 QAM), sixty-four quadrature amplitude modulation (64 QAM), etc. Accordingly, due to these and other fundamental differences between the PDCCH and ePDCCH, it may be infeasible and/or undesirable to simply extend PDCCH mapping procedures to the ePDCCH.

Aspects of this disclosure provide a mechanism for mapping encoded control information to an ePDCCH search space of a UE. More specifically, the ePDCCH search space may include a physical resource block (PRB) pair located in a data region of a downlink subframe. The encoded control information may be mapped into one or more eCCEs of the ePDCCH search space beginning from a starting location. The PRB pair, as well as the starting location within the PRB pair, are identified in accordance with an offset associated with the UE. A number of eCCEs carrying encoded information may correspond to an aggregation level. The offset may be communicated to the UE as via higher layer signaling or in the PDCCH of the subframe. Alternatively, the offset may be a priori information of the UE. The aggregation level may be determined by the base station in accordance with various criteria, e.g., channel state information, interference levels, etc. The UE may not know the aggregation level when performing the ePDCCH search, and instead may locate eCCEs carrying the encoded information by performing a blind search at the starting eCCE location, e.g., as indicated by the offset. Further aspects of this disclosure provide a mechanism for mapping scrambled control data into the ePDCCH.

Figure 1:
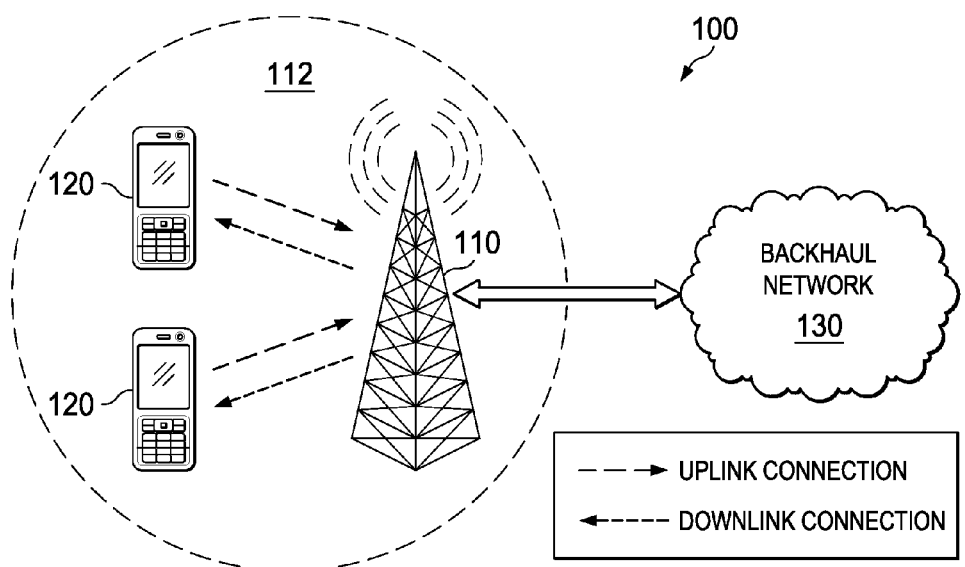
FIG. 1 illustrates diagram of a wireless network for communicating data.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
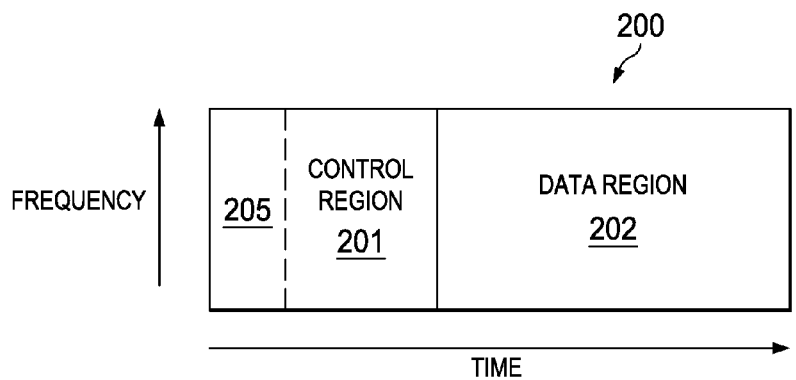
FIG. 2 illustrates a diagram of a conventional subframe.

In 3GPP LTE rel-10, control channels (e.g., PDCCH, etc.) are carried in the control region, while data channels (e.g., PDSCH, etc.) are carried in the data region. FIG. 2 illustrates a conventional subframe 200, as might be communicated in a network operating in accordance with 3GPP LTE Rel-10. As shown, the conventional subframe includes a control region 201 and data region 202. The control region 201 includes a PDCCH 205 that carries downlink control information (DCI) used for downlink and uplink grants. The control region 201 may include other control channels as well, such as a Physical Hybrid Indicator Channel (PHICH) carrying ACK/NACK in response to uplink data transmissions, a Physical Control Format Indicator Channel (PCFICH) indicating the number of symbols in the control region 201, and others.

The PDCCH 205 is made up of one or more control channel elements (CCEs), which are assigned to UEs via a mapping procedure that specifies a time and frequency location within the PDCCH. A particular PDCCH assignment/grant occupies one or more CCEs. The CCEs are often mapped to noncontiguous resource element groups (REGs) in order to achieve frequency diversity. A UE may use search space rules to identify possible CCEs that contain uplink/downlink grants for that UE. The search space rules may have provisions for a common search space. Search space rules may also provide an upper bound for device complexity. The PDCCH 205 is located in the first several symbols (e.g., one to four symbols) of the subframe 200. These PDCCH-bearing symbols may be referred to as a control domain or a control region. Other symbols are used for data transmission, and may be referred to as a data domain or a data region. Hence, the PDCCH is located in the control domain while the Physical Downlink Shared Channel (PDSCH) is located in the data domain.

Figure 3A:
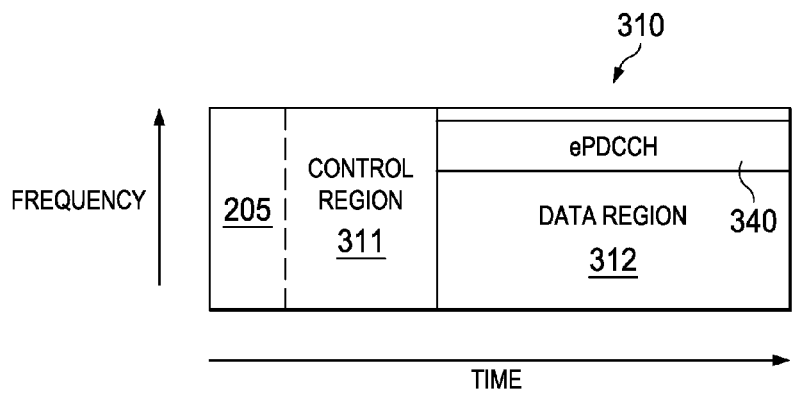
FIGS. 3A-3C illustrates diagrams of next-generation subframes carrying an ePDCCH.
Figure 3B:
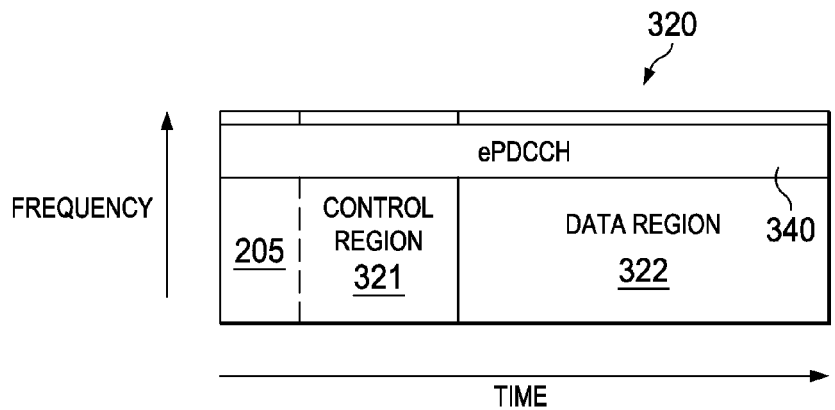
Figure 3C:
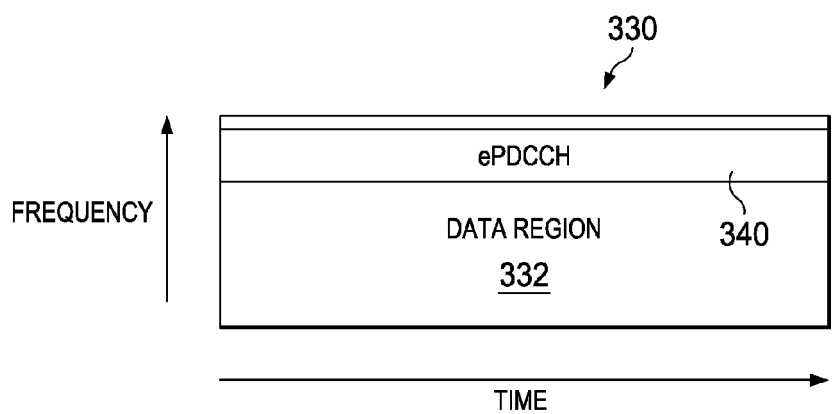

In next-generation LTE standards, an ePDCCH may be at least partially carried by the data region of a downlink subframe. FIGS. 3A-3C illustrate next-generation subframes 310-330 carrying an ePDCCH 340. FIG. 3A illustrates a subframe 310 including a control region 311 and a data region 312. The subframe 310 carries the entire ePDCCH 340 in the data region 312. FIG. 3B illustrates a subframe 320 including a control region 321 and a data region 322. The subframe 320 carries portions of the ePDCCH 340 in both the control region 321 and the data region 322. FIG. 3C illustrates a subframe 330 that includes only a data region 332, and which carries the ePDCCH 340 entirely in the data region 332.

Like the PDCCH, the ePDCCH may carry uplink grants and downlink grants for UEs. However, as discussed above, the ePDCCH may have different characteristics than the PDCCH, and consequently new techniques for mapping eCCEs to UEs may be desired. Aspects of this disclosure allow users to identify eCCEs in the ePDCCH through an offset and aggregation level. More specifically, users may utilize mapping information conveyed by an offset and aggregation level to locate eCCEs allocated to the user within the ePDCCH of a downlink subframe. In an embodiment, the offset specifies a starting location within the ePDCCH, and the aggregation level specifies a number of eCCEs allocated to the user. The user may determine the offset in accordance with control information communicated by the base station, e.g., via radio resource control (RRC) signaling, and/or in accordance with a priori information of the user, e.g., the offset may correspond to an identifier of the user. The user may determine the aggregation level via blind decoding of the ePDCCH.

The following is a brief description of how offset and aggregation level can be used to locate allocated eCCEs within an ePDCCH of a subframe. Notably, the descriptions below (as well as the diagrams illustrated in FIGS. 4-6) assume that each physical resource block (PRB) pair carries four eCCEs. However, in practice, PRB pairs may carry any number of eCCEs, and the offset and aggregation level of this disclosure can be modified accordingly.

Figure 4:
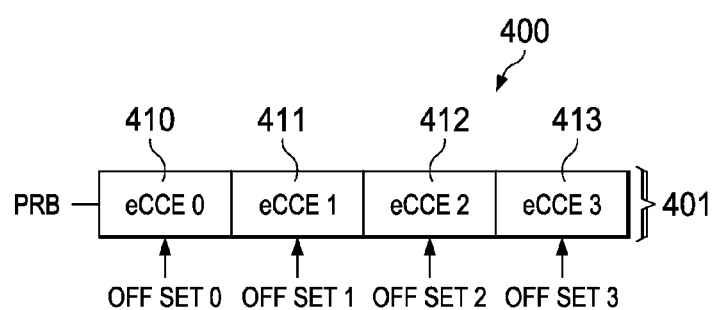
FIG. 4 illustrates a diagram of embodiment mappings of offsets to enhanced control channel elements (eCCEs) locations in an ePDCCH.

UEs may use the offset to identify a starting location during eCCE mapping. FIG. 4 illustrates a diagram for mapping offsets to starting eCCE locations in a portion of an ePDCCH 400 carried in a PRB pair 401. As shown, an Offset-0 maps to the eCCE-0 410, an Offset-1 maps to the eCCE-1 411, an Offset-2 maps to the eCCE-2 412, and an Offset-3 maps to the eCCE-1 413. Hence, each offset maps to a different one of the eCCEs 410-413 in the PRB 401. The offset may indicate a starting location to a UE. For instance, a UE receiving the Offset-2 would know that eCCE-2 was the first allocated eCCE in a group of one or more eCCEs allocated to the UE. After identifying the starting location, a UE may identify additional eCCEs in the group and then perform blind decoding.

Figure 5:
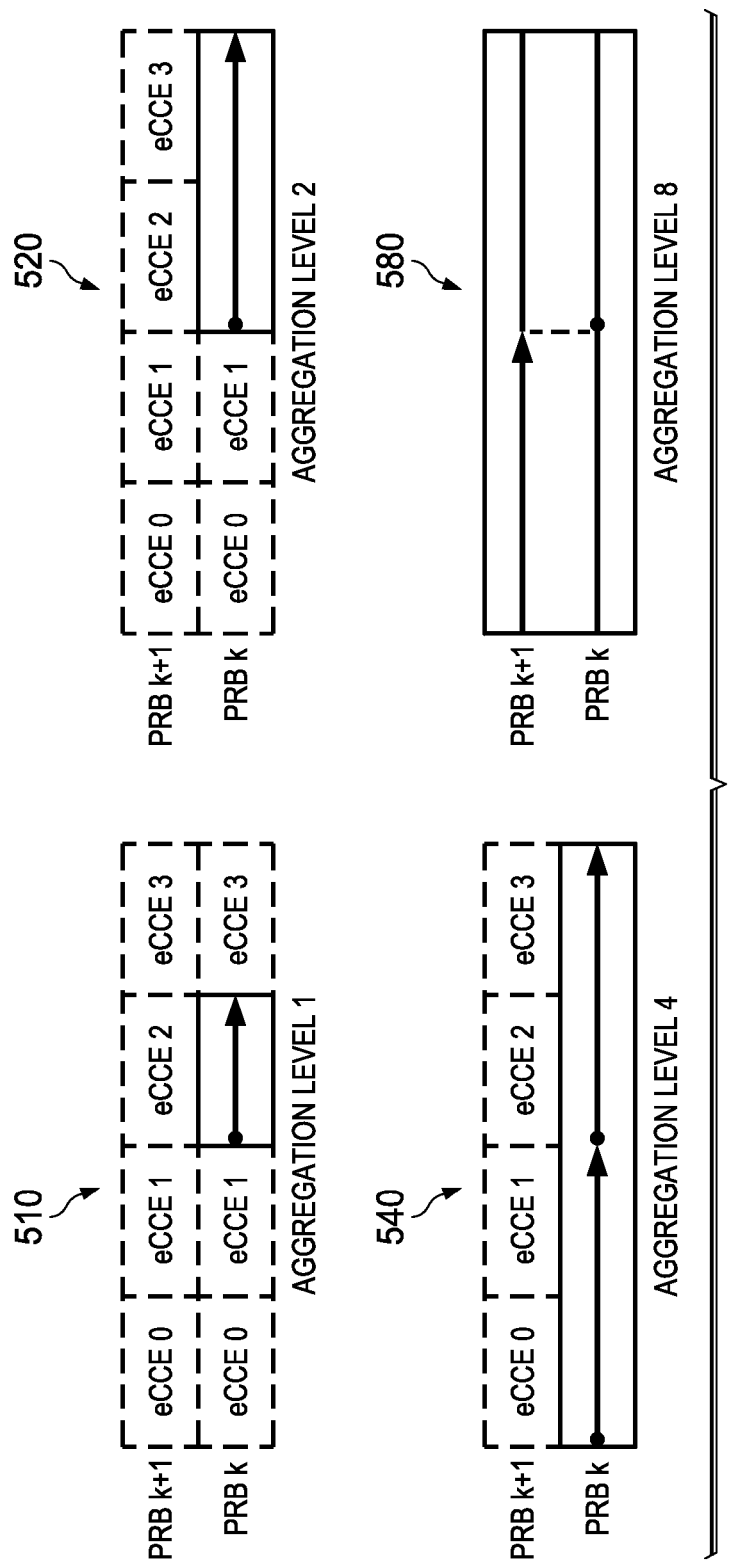
FIG. 5 illustrates a diagram of a set of embodiment mappings of aggregation levels to eCCE locations in an ePDCCH.
Figure 6:
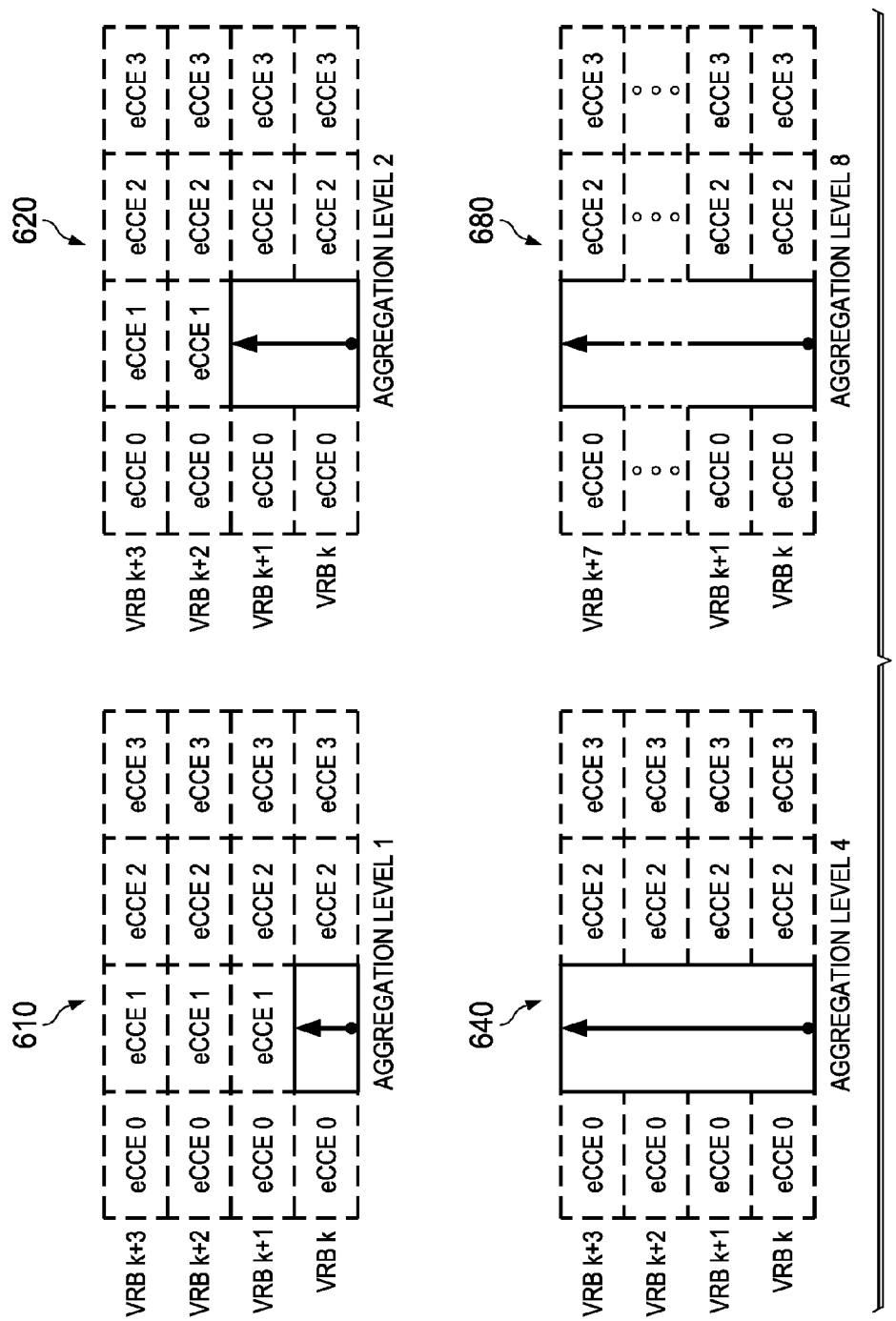
FIG. 6 illustrates a diagram of another set of embodiment mappings of aggregation levels to eCCE locations in an ePDCCH.

The location of eCCEs may depend on whether the ePDCCH was communicated in accordance with a localized transmission technique or a distributed transmission technique. When the ePDCCH is communicated in accordance with localized transmission, the remaining allocated eCCEs are located in the same PRB or PRB pair as the first allocated eCCE. FIG. 5 illustrates embodiment ePDCCH mappings 510-580 for aggregation levels one through eight when the ePDCCH is communicated using localized transmission. While the embodiment ePDCCH mappings 510-580 assume an offset of two, the mapping principals demonstrated thereby may be applied to any offset. When the ePDCCH is communicated in accordance with distributed transmission, the remaining allocated eCCEs are located in a different PRB than the first allocated eCCE. FIG. 6 illustrates embodiment ePDCCH mappings 610-680 for aggregation levels one through eight when the ePDCCH is communicated using distributed transmission. As shown, the ePD-CCH mappings 610-680 map aggregation levels one through eight to virtual resource blocks (VRBs). While the embodiment ePDCCH mappings 610-680 assume an offset of two, the mapping principals demonstrated thereby may be applied to any offset.

Figure 7:
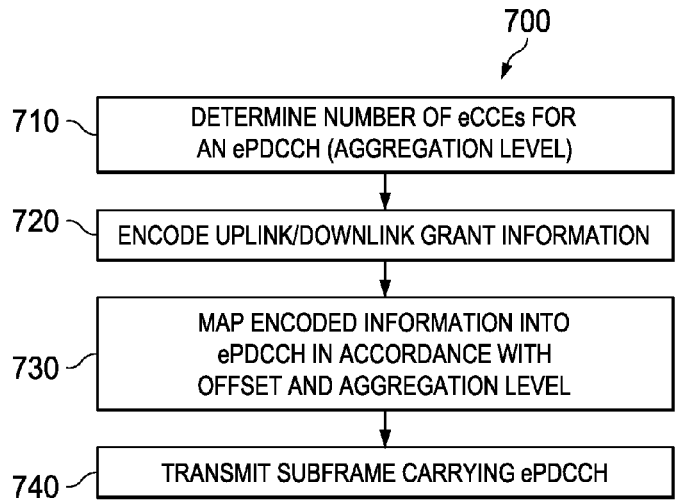
FIG. 7 illustrates a flowchart of an embodiment method for mapping eCCEs to a UE.

FIG. 7 illustrates a method 700 for ePDCCH mapping, as might be performed by a base station. The method 700 begins at step 710, where the base station determines a number of eCCEs in an ePDCCH that will carry downlink control information to the UE. The number of eCCEs allocated for carrying downlink control information to the UE may be equivalent to an aggregation level associated with the UE. Thereafter, the method 700 proceeds to step 720, where the base station encodes the uplink/downlink grant information of the UE. Thereafter, the method 700 proceeds to step 730, where the base station maps the encoded information to the ePDCCH in accordance with an offset and aggregation level associated with the UE. Next, the method 700 proceeds to the step 740, where the base station transmits the subframe carrying the ePDCCH.

In some embodiments, the UE determines the offset value through examination of configuration parameters, e.g., UE ID, etc. The offset (or parameters used to determine the offset) may be communicated to the UE via higher layer signaling, e.g., radio resource control (RRC) signaling, before the DCI is communicated via the ePDCCH. Alternatively, the offset may be communicated in a channel (e.g., PDCCH or otherwise) of the downlink subframe. In some embodiments, the offset may be determined in accordance with a priori information of the UE. The UE may determine the aggregation level through blind decoding of the ePD-CCH. Hence, the aggregation level may not be explicitly communicated to the UE by the base station.

Figure 8:
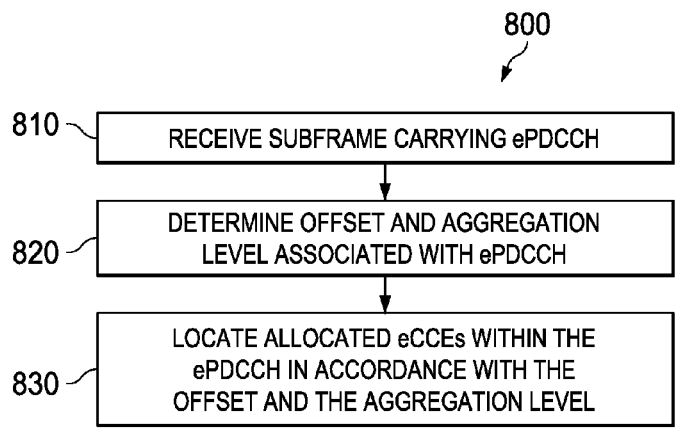
FIG. 8 illustrates a flowchart of an embodiment method for locating allocated eCCEs in an ePDCCH.

FIG. 8 illustrates a method 800 for locating allocated eCCEs in an ePDCCH, as might be performed by a UE. The method 800 begins at step 810, where the UE receives a downlink subframe carrying an ePDCCH from a base station. Next, the method 800 proceeds to step 820, where the UE identifies an offset and aggregation level associated with the subframe. In some embodiments, the aggregation level is determined by the UE using blind decoding. In other embodiments, the aggregation level is communicated by the base station. In some embodiments, the offset is also communicated by the base station. In other embodiments, the offset is a priori information of the UE. Subsequently, the method 800 proceeds to step 830, where the UE locates the allocated eCCEs within the ePDCCH in accordance with the offset and aggregation level.

Differences between the PDCCH and the ePDCCH are generally outlined in Table 1 (below). Because the ePDCCH search space is different than the PDCCH search space, methods to define ePDCCH search space generally are needed. Further, because the enhanced control channel element (eCCE) is of variable size, the PDCCH scrambling procedure generally cannot be reused on the ePDCCH. Therefore, an ePDCCH scrambling procedure generally is needed.

TABLE 1

| Feature | PDCCH | ePDCCH |
| --- | --- | --- |
| Location with subframe | Control region | Data region |
| Multiplexing | Other PDCCH, PCFICH (physical control format indicator channel), PHICH (physical HARQ indicator channel), CRS (common reference signal) | Other ePDCCH, PDSCH (Physical Downlink Shared Channel), CRS, other reference signals (DMRS, CSI-RS, etc.) |
| Modulation | Fixed, QPSK (quadrature phase shift keying) | Variable including QPSK, possibly 16-QAM, 64-QAM |
| Payload size definition | Control channel element (CCE), where each CCE has a fixed size. 1, 2, 4, or 8 CCEs can be assigned for a PDCCH | Enhanced CCE (eCCE) proposed where each eCCE may be variable in size. |
| Scrambling | 1-to-1 correspondence between scrambling sequence and CCE number and position within CCE. | To be defined |
| Search space rules | Hash function | To be defined |
| CCE location | Function of control region size, number of CRS, number of PHICH, cell id, and an interleaver. | To be defined |
| Decomposition of CCE | Resource element group (REG). 1 CCE has 9 REGs, each REG has 4 resource elements (REs) | REs |

For ePDCCH, the search space concept may be extended. An ePDCCH search space may consist of a set of enhanced CCEs (eCCEs), and may be defined in terms of eCCEs or Resource Block (RB) pairs. A RB pair may comprise four eCCEs. Note that unlike the PDCCH search space, the eCCEs (or RBs) not used for ePDCCH transmission may be used for other transmission (other ePDCCH, PDSCH, or other channels). Note also that the eCCE size may vary on a subframe-by-subframe basis, depending on the amount of overhead e.g., the number of symbols used for the control region, the amount of CSI-RS, the absence/presence of CRS, and so forth.

There may be two types of ePDCCH search space. First, there may be a UE-specific ePDCCH search space, which is specific to one user (or a group of users). This UE-specific region may be indicated to the UE by higher layer signaling (Radio Resource Control (RRC) signaling), dynamic signaling (PDCCH or ePDCCH), or preconfiguration, e.g., a formula-based calculation or a fixed location.

Second, there may be an ePDCCH common search space (CSS) that all UEs may process. Such a CSS may be used to send some resource assignments or other signaling information.

The ePDCCH and PDSCH are not multiplexed together in a physical resource block (PRB) pair but are multiplexed at the PRB pair level. Because one PRB pair contains a large number of Resource Elements (REs), the granularity of the PRB pair generally is too big for the ePDCCH. In other words, the PRB pair cannot be the eCCE. It is generally accepted that there are two to four eCCEs per PRB pair. Without loss of generality, it is assumed that there are four eCCEs per PRB pair. Note that with a number of eCCEs per PRB pair, the search space can be defined either in terms of PRB pairs or eCCEs. The two descriptions generally are equivalent.

Although the search space rules indicate possible locations for eCCEs, a UE must perform hypothesis testing (e.g. blind decoding) over the possible locations to find its ePDCCH. Because the number of blind decodes that a UE can perform is limited, the number of candidates that can be searched by the UE generally are restricted. Since the ePDCCH corresponds to a number of eCCEs, this means that the number of PRB pairs that can be examined generally is fairly small.

Another related issue is the trunking efficiency. Because the search space is defined in terms of PRB pairs, generally it is desirable to have some candidate sets in the search space starting from a different eCCE index to make sure that PRB pairs are fully occupied. Logically speaking, assume that an ePDCCH uses eCCEs #0 and #1 of a given PRB pair. Another ePDCCH should be able to use eCCEs #2 and #3; otherwise these two eCCEs would be wasted.

Mechanisms to provide uniform usage of eCCEs are provided. Note that while the description generally is in terms of eCCEs, the discussion is applicable to enhanced Resource Element Groups (eREGs), if such a concept is implemented, with an eREG being a fraction of an eCCE (or regular CCE). Note also that the description is valid for a UE-specific or a common ePDCCH search space.

An embodiment provides a procedure for mapping ePDCCH candidates into the search space. An embodiment provides a search space structure such that both frequency-diverse and frequency-localized transmissions can be used with a good trunking efficiency. An embodiment provides a scrambling procedure for the ePDCCH. Embodiments may be applied to LTE Rel-11 (and later) compliant networks and devices, such as eNBs and UEs.

Regarding ePDCCH mapping during localized transmission. This generally provides the benefit, amongst others, of frequency selectivity. In an embodiment, each UE has a offset value to indicate on which eCCE to start locating and decoding the candidates. The offset i is a value between 0 and $N_{eCCE}-1$. Note that similarly, an offset value could be defined if the search space eCCE indexing is done over the entire search space. Table 2 shows an example of candidate mapping within the UE-specific search space, where the symbol "%" indicates a modulo operation. The candidates are defined under the assumption that $N_{eCCE}=4$ eCCEs and that the eCCEs are numbered from 0 to $N_{eCCE}-1$. In practice, the eCCEs might be numbered over the entire set of eCCEs, with eCCEs numbered from smallest to largest.

TABLE 2

| Aggregation level | ePDCCH candidate mapping |
| --- | --- |
| 1 | eCCE i |
| 2 | eCCE i, (eCCE i + 1)%4 |
| 4 | eCCE i, (eCCE i + 1)%4, (eCCE i + 2)%4, (eCCE i + 3)%4 |
| 8 | eCCE i, (eCCE i + 1)%4, (eCCE i + 2)%4, (eCCE i + 3)%4 And same sequence on next VRB in search space |

Instead of looking at eCCE 0 for aggregation level 1, then eCCE 0 and eCCE 1 for aggregation level 2, and so forth, the UE starts at eCCE i and wraps around when needed. Note however that wraparound generally is not needed. On a given PRB pair, the UE may start from the lowest CCE index to the highest CCE index to attempt to decode the ePDCCH candidate. If wraparound is needed, it may also be possible to change the offset value.

The value of the parameter i can be signaled by e.g., RRC signaling. However, in some embodiments this step may not be needed, and the value of this parameter can be implicitly derived from, e.g., the UE ID.

When adaptive modulation is used on the ePDCCH, an eCCE can support more channel bits with higher order modulation than an eCCE that uses QPSK modulation. Note that more channel bits may imply a larger payload size and/or more redundancy. It is possible for one ePDCCH to have two eCCEs using QPSK modulation. With adaptive modulation, the two eCCEs can use 16-QAM with each eCCE conveying an ePDCCH. A different value for the offset can be used to indicate the modulation.

Regarding distributed ePDCCH schemes. When the ePDCCH is distributed, one embodiment avoids using eCCEs in the same PRB pair because eCCEs from the same PRB pair generally have little if any frequency diversity. Using an offset value, as described with respect to localized ePDCCH, can be an effective solution. In this section, assume that the search space is determined in terms of Virtual Resource Blocks (VRBs). The VRBs may be distributed using the Release-8 Distributed VRB (DVRB) mapping rule, but that is not a requirement generally as long as there is a unique VRB to PRB or RB mapping. An embodiment has a fixed offset for each UE, and the UE looks sequentially at the eCCE #i on consecutive VRBs, possibly wrapping up over the entire search space, if needed. Table 3 shows a mapping of ePDCCH candidates during distributed transmission.

TABLE 3

| Aggregation level | ePDCCH candidate mapping |
| --- | --- |
| 1 | eCCE i on VRB k |
| 2 | eCCE i on VRB k, eCCE i on VRB k + 1 |
| 4 | eCCE i on VRB k, eCCE i on VRB k + 1, eCCE i on VRB k + 2, eCCE i on VRB k + 3 |
| 8 | eCCE i on VRB k, eCCE i on VRB k + 1, eCCE i on VRB k + 2, eCCE i on VRB k + 3, |

TABLE 3-continued

| Aggregation level | ePDCCH candidate mapping |
|---|---|
| | eCCE i on VRB k + 4, |
| | eCCE i on VRB k + 5, |
| | eCCE i on VRB k + 6, |
| | eCCE i on VRB k + 7 |

Regarding ePDCCH mapping during a combined localized and distributed Transmission. While transmission for localized ePDCCH and distributed ePDCCH have been described separately, the two may be combined together. For example, some aggregation levels (e.g., 1, 2) may be localized, while others (e.g., 4, 8) may be distributed.

In another example, for common search spaces, a distributed transmission scheme can be used, while for the UE specific search space, a localized search space is used. One such rule is as follows:

$$\text{search space} = \begin{cases} \text{common} & \#eCCE < \min(T_{eCCE}, t) \\ \text{ue-specific} & \#eCCE \geq \min(T_{eCCE}, t) \end{cases}.$$

For eCCEs numbered less than some threshold, the common search space is used.

The techniques used for scrambling control channel bits in the PDCCH may not be suitable for the ePDCCH, as the ePDCCH may have varying capacity depending on the configuration of the eCCEs. The PDCCH scrambling procedure is described in Section 6.8.1 of 3GPP TS 36.211, v10.0.0 as follows: The block of bits $b^{(i)}(0), \ldots, b^{(i)}(M_{bit}^{(i)}-1)$ on each of the control channels to be transmitted in a subframe, where $M_{bit}^{(i)}$, is the number of bits in one subframe to be transmitted on physical downlink control channel number i, shall be multiplexed, resulting in a block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$, where $n_{PDCCH}$ is the number of PDCCHs transmitted in the subframe. The block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ shall be scrambled with a cell-specific sequence prior to modulation, resulting in a block of scrambled bits $\tilde{b}(0), \ldots, \tilde{b}(M_{tot}-1)$ according to: $\tilde{b}(i)=(b(i)+c(i))\mod 2$, where the scrambling sequence c(i) is given by Section 7.2. The scrambling sequence generator shall be initialized with $c_{init}=\lfloor n_s/2 \rfloor 2^9+N_{ID}^{cell}$ at the start of each subframe. CCE number n corresponds to bits b(72n), b(72n+1), . . . , b(72n+71). If necessary, <NIL> elements shall be inserted in the block of bits prior to scrambling to ensure that the PDCCHs starts at the CCE positions as described in [4] and to ensure that the length $M_{tot}=8N_{REG} \geq \sum_{i=0}^{n_{PDCCH}-1} M_{bit}^{(i)}$ of the scrambled block of bits matches the amount of resource-element groups not assigned to PCFICH or PHICH. Generally, in the procedure, a scrambling sequence of length $72 \times N_{CCE}$ is generated, with $N_{CCE}$ being the total number of CCEs in the control region. CCE #k is coded with the sequence c(72×k), c(72×k+71).

The above described scrambling procedure (as used for the PDCCH) cannot be extended in a straightforward manner to the ePDCCH for the following reasons. First, adaptive modulation may be used on the ePDCCH. As a consequence, the number of bits that can be transmitted on one eCCE depends on the modulation index. Second, and more fundamentally, the eCCE size may vary, depending on various overheads. Consequently, a new scrambling algorithm is desired.

The following is brief description of an embodiment of this disclosure. For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$ where $N_{ECCE,p,k}$ is the number of ECCEs in EPDCCH-PRB-set p of subframe k. Each EPDCCH-PRB-set can be configured for either localized EPDCCH transmission or distributed EPDCCH transmission. The UE shall monitor a set of EPDCCH candidates on one or more activated serving cells as configured by higher layer signalling for control information, where monitoring implies attempting to decode each of the EPDCCHs in the set according to the monitored DCI formats. The set of EPDCCH candidates to monitor are defined in terms of EPDCCH UE-specific search spaces. For each serving cell, the subframes in which the UE monitors EPDCCH UE-specific search spaces are configured by higher layers. The UE shall not monitor EPDCCH: For TDD and normal downlink CP, in special subframes for the special subframe configurations 0 and 5; For TDD and extended downlink CP, in special subframes for the special subframe configurations 0, 4 and 7; In subframes indicated by higher layers to decode PMCH; For TDD and if the UE is configured with different UL/DL configurations for the primary and a secondary cell, in a downlink subframe on the secondary cell when the same subframe on the primary cell is a special subframe and the UE is not capable of simultaneous reception and transmission on the primary and secondary cells.

An EPDCCH UE-specific search space $ES_k^{(L)}$ at aggregation level $L \in \{1,2,4,8,16,32\}$ is defined by a set of EPDCCH candidates. For an EPDCCH-PRB-set p, the ECCEs corresponding to EPDCCH candidate m of the search space $ES_k^{(L)}$ are given by $$L\left\{\left(Y_{p,k}+\left\lfloor\frac{m \cdot N_{ECCE,p,k}}{L \cdot M_p^{(L)}}\right\rfloor+b\right)\mod \lfloor N_{ECCE,p,k}/L\rfloor\right\}+i,$$

where $Y_{p,k}$ is defined below, $i=0, \ldots, L-1$, $b=n_{CI}$ if the UE is configured with a carrier indicator field for the serving cell on which EPDCCH is monitored, otherwise $b=0$, $n_{CI}$ is the carrier indicator field value, $m=0, 1, \ldots M_p^{(L)}-1$, $M_p^{(L)}$ is the number of EPDCCH candidates to monitor at aggregation level L in EPDCCH-PRB-set p. A UE is not expected to monitor an EPDCCH candidate, if an ECCE corresponding to that EPDCCH candidate is mapped to a PRB pair that overlaps in frequency with a transmission of either PBCH or primary or secondary synchronization signals in the same subframe. A UE is not expected to monitor a EPDCCH candidate, if the UE is configured with two EPDCCH-PRB-sets, and if the PRB-pairs corresponding to the EPDCCH-PRB-sets overlap, and if both the EPDCCH-PRB-sets are configured for either localized transmission or distributed transmission, and if all the ECCEs corresponding to the EPDCCH candidate are mapped to the overlapping PRB-pairs, and if the UE is configured with the same $n_{ID,i}^{EPDCCH}$ value for both EPDCCH-PRB-sets ($n_{ID,i}^{EPDCCH}$).

The variable $Y_{p,k}$ is defined by $Y_{p,k}=(A_p \cdot Y_{p,k-1})\mod D$ where $Y_{p,-1}=n_{RNTI}\neq 0$, $A_0=39827$, $A_1=39829$, $D=65537$ and $k=\lfloor n_s/2 \rfloor$, $n_s$ is the slot number within a radio frame. The DCI formats that the UE shall monitor depend on the configured transmission mode per each serving cell. If the UE is not configured with a carrier indicator field for the serving cell on which EPDCCH is monitored, $\hat{N}_{RB}^{DL}=N_{RB}^{DL}$ of the serving cell on which EPDCCH is monitored. If the UE is configured with a carrier indicator field for the serving cell on which EPDCCH is monitored, $\hat{N}_{RB}^{DL}=N_{RB}^{DL}$ of the serving cell indicated by $n_{CI}$.

Aspects of this disclosure provide an ePDCCH Scrambling procedure. In an embodiment, the scrambling procedure for the PDCCH is modified to be used for the ePDCCH as well. The embodiment generates a scrambling sequence longer than needed, and skips some bits when not needed.

Figure 9:
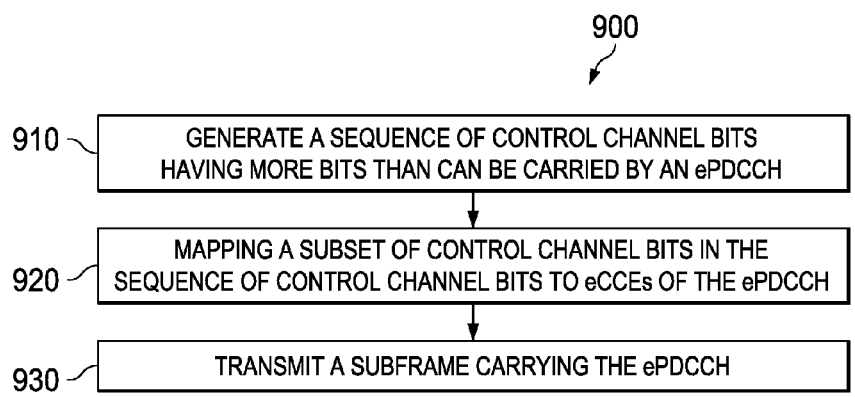
FIG. 9 illustrates a flowchart of an embodiment method for mapping control channel bits to an ePDCCH.

FIG. 9 illustrates a flowchart of an embodiment method 900 for mapping control channel data into an ePDCCH, as might be performed by a base station. The method 900 begins at step 910, where the base station generates a sequence of control channel bits having more bits than can be carried by an ePDCCH. Thereafter, the method 900 proceeds to step 920, where the base station maps a subset of control channel bits in the sequence of control channel bits to eCCEs of the ePDCCH. Next, the method 900 proceeds to step 930, where the base station transmits a subframe carrying the ePDCCH. Notably, the subset of control channel bits includes fewer than all control channel bits of the sequence of control channel bits. Hence, the sequence of control channel bits includes at least one or more excess control channel bits that are not mapped to the eCCEs, and therefore not transmitted in the subframe.

One embodiment of the ePDCCH scrambling procedure is described as follows: (1) A sequence c of n_RB×A bits is generated, following the procedure described in Section 7.2 of TS 36.211. The parameter n_RB is the total number of PRB pairs per carrier, and A is a number which is larger than the maximum eCCE size, when expressed in bits. For instance, for $N_{eCCE}=4$ eCCEs/PRB pair, and a maximum modulation order of 4 (16-QAM), A can be any value at least equal to $168/N_{eCCE} \times 4=168$. (2) eCCEs are indexed from 0 to $n\_RB \times N_{eCCE}-1$, with $N_{eCCE}$ being the maximum number of eCCEs per PRB pair (e.g., $N_{eCCE}=4$), so that the eCCEs on VRB k are numbered $k \times N_{eCCE}, \ldots, (k+1) \times N_{eCCE}-1$. (3) The sequence of bits to be mapped on eCCE #j is scrambled with the bit sequence $c(j \times A), \ldots, c(j \times A+L(j)-1)$, with $L(j)$ being the length of eCCE #j ($L(j) \leq A$) using the procedure described in section 6.8.1 of 3GPP TS 36.211.

Figure 10:
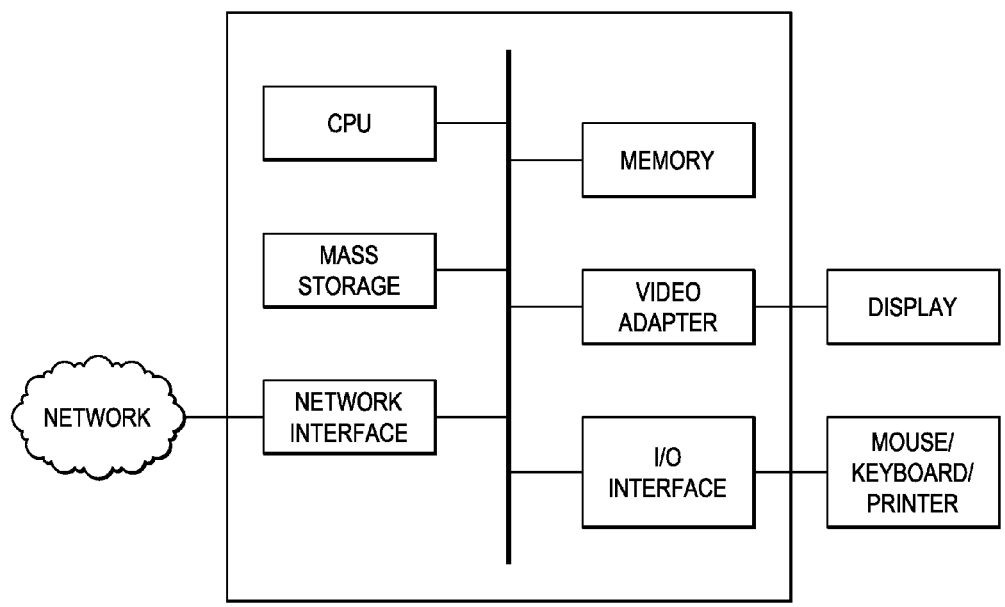
FIG. 10 illustrates a block diagram of a computing platform.

FIG. 10 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 11:
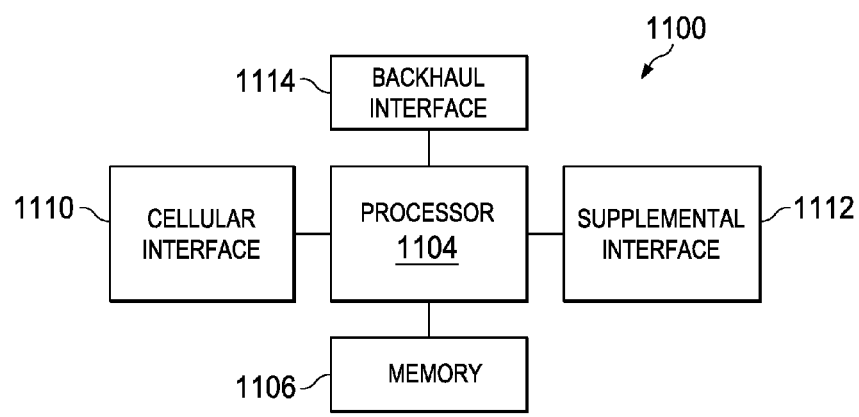
FIG. 11 illustrates a block diagram of a communications device.

FIG. 11 illustrates a block diagram of an embodiment of a communications device 1100, which may be equivalent to one or more devices (e.g., UEs, NBs, etc.) discussed above. The communications device 1100 may include a processor 1104, a memory 1106, a cellular interface 1110, a supplemental interface 1112, and a backhaul interface 1114, which may (or may not) be arranged as shown in FIG. 11. The processor 1104 may be any component capable of performing computations and/or other processing related tasks, and the memory 1106 may be any component capable of storing programming and/or instructions for the processor 1104. The cellular interface 1110 may be any component or collection of components that allows the communications device 1100 to communicate using a cellular signal, and may be used to receive and/or transmit information over a cellular connection of a cellular network. The supplemental interface 1112 may be any component or collection of components that allows the communications device 1100 to communicate data or control information via a supplemental protocol. For instance, the supplemental interface 1112 may be a non-cellular wireless interface for communicating in accordance with a Wireless-Fidelity (Wi-Fi) or Bluetooth protocol. Alternatively, the supplemental interface 1112 may be a wireline interface. The backhaul interface 1114 may be optionally included in the communications device 1100, and may comprise any component or collection of components that allows the communications device 1100 to communicate with another device via a backhaul network.

The following references are related to subject matter of the present application. Each of these references is incorporated herein by reference in its entirety: (i) 3GPP TS 36.211, v10.0.0; and (ii) 3GPP TS 36.213, v10.0.0.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for searching an enhanced physical downlink control channel (ePDCCH) channel, the method comprising:
   receiving a subframe;
   computing, by a user equipment (UE), an offset based on a UE identifier (ID) of the UE, the offset being computed directly by the UE instead of being received via control signaling from a base station;
   identifying, in accordance with the offset, a starting location in a search space of the UE, wherein the search space of the UE corresponds to resource elements in the subframe; and
   locating, by the UE, one or more resource elements in the search space of the UE, the one or more resource elements beginning from the starting location in the search space and including a subset of the resources elements in the subframe.

2. The method of claim 1, wherein the offset indicates an enhanced control channel element to start locating and decoding an aggregation level and an enhanced physical downlink control channel candidate in the search space.

3. The method of claim 1, wherein the one or more resource elements are located in a data region of the subframe.

4. The method of claim 3, wherein the one or more resource elements comprise enhanced control channel elements (eCCEs) in the data region of the subframe.

5. The method of claim 3, wherein the search space comprises two or more physical resource block (PRB) sets located in the data region of the subframe.

6. The method of claim 1, wherein the UE ID is a radio network temporary identifier (RNTI) assigned to the UE.

7. A user equipment (UE) controller comprising:
   a processor; and
   a non-transitory computer readable storage medium storing programming for execution by the processor, the programming including instructions to:
      receive a subframe;
      compute an offset based on a UE identifier (ID) of the UE, the offset being computed directly by the UE instead of being received via control signaling from a base station;
      identify a starting location in a search space of the UE, wherein the search space of the UE corresponds to resource elements in the subframe; and
      locate one or more resource elements in the search space of the UE, the one or more resource elements beginning from the starting location in the search space and including a subset of the resources elements in the subframe.

8. The UE of claim 7, wherein the offset indicates enhanced control channel element to start locating and decoding an aggregation level and an enhanced physical downlink control channel candidate in the search space.

9. The UE of claim 7, wherein the one or more resource elements are located in a data region of the subframe.

10. The UE of claim 9, wherein the one or more resource elements comprise enhanced control channel elements (eC-CEs) in the data region of the subframe.

11. The UE of claim 9, wherein the search space comprises two or more physical resource block (PRB) sets located in a data region of the subframe.

12. A method for communicating an enhanced physical downlink control channel (ePDCCH) channel, the method comprising:
   determining an offset for a user equipment (UE) based on a UE identifier (ID) of the UE;
   determining, in accordance with the offset, a starting location for a physical resource block (PRB) set in a search space of the UE;
   mapping encoded control information to one or more resource elements of a subframe, the one or more resource elements starting from the starting location in the PRB set, wherein the encoded control information indicates uplink or downlink resources allocated to the UE; and
   transmitting, by a communications controller, the subframe to the UE without communicating the offset to the UE, the offset being computed independently by the UE according to the UE ID instead of being received via control signaling from the communications controller.

13. The method of claim 12, wherein the one or more resource elements are located in a data region of the subframe.

14. The method of claim 13, wherein the one or more resource elements comprise enhanced control channel elements (eCCEs) in the data region of the subframe.

15. The method of claim 12, wherein the UE ID is a radio network temporary identifier (RNTI) assigned to the UE.

16. A communications controller comprising:
   a processor; and
   a non-transitory computer readable storage medium storing programming for execution by the processor, the programming including instructions to:
      determine an offset for a user equipment (UE) based on a UE identifier (ID) of the UE;
      determine, in accordance with the offset, a starting location for a physical resource block (PRB) set in a search space of the UE;
      map encoded control information to one or more resource elements of a subframe, the one or more resource elements starting from the starting location in the PRB set, wherein the encoded control information indicates uplink or downlink resources allocated to the UE; and
      transmit the subframe to the UE without communicating the offset to the UE, the offset being computed independently by the UE according to the UE ID instead of being received via control signaling from the communications controller.

17. The communications controller of claim 16, wherein the one or more resource elements are located in a data region of the subframe.

18. The communications controller of claim 17, wherein the one or more resource elements comprise enhanced control channel elements (eCCEs) in the data region of the subframe.

19. A method for searching an enhanced physical downlink control channel (ePDCCH) channel, the method comprising:
   receiving a radio frame;
   computing, by a user equipment (UE), an offset ($Y_{p,k}$) based on the following algorithm: $Y_{p,k}=(A_p \cdot Y_{p,k-1}) \bmod D$, where $Y_{p,k-1}=n_{RNTI}$, $A_p$ is a constant based on an ePDCCH physical resource block (PRB) set (EPD- CCH-PRB-set) being monitored by the UE, D=65537 and $k=\lfloor n_s/2 \rfloor$, $n_s$ is the slot number within the radio frame;

identifying a UE-specific search space according to the offset ($Y_{p,k}$); and locating, by the UE, one or more resource elements in the UE-specific search space of the UE.

20. The method of claim 19, wherein identifying the UE-specific search space according to the offset ($Y_{p,k}$) comprises identifying the UE-specific search space according to the following algorithm:

$$L\left\{\left(Y_{p,k} + \left\lfloor \frac{m \cdot N_{ECCE,p,k}}{L \cdot M_p^{(L)}} \right\rfloor + b\right) mod \lfloor N_{ECCE,p,k}/L \rfloor\right\} + i,$$

where L is the aggregation level, b is equal to a carrier indicator value ($n_{CI}$) if the UE is configured with a carrier indicator field for the serving cell on which ePDCCH is monitored and b is equal to 0 if UE is not configured with a carrier indicator field for the serving cell on which ePDCCH is monitored, m is a number of EPDCCH candidates monitored at the aggregation level, p identifies the EPDCCH-PRB-set, k is an index identifying a subframe carrying the identified EPDCCH-PRB-set, $N_{ECCE,p,k}$ is the number of enhance control channel elements (eCCEs) in the identified ePDCCH physical resource block (PRB) set in the identified subframe, $M_p^{(L)}$ is the number of EPDCCH candidates to monitor at the aggregation level in the identified EPDCCH-PRB-set, and i is a physical downlink control channel number.

* * * * *